United States Patent Office 3,574,072
Patented Apr. 6, 1971

3,574,072
POLYMERIZATION OF HETEROCYCLIC
COMPOUNDS
James J. Louvar, Evanston, Ill., assignor to Universal
Oil Products Company, Des Plaines, Ill.
No Drawing. Filed Apr. 3, 1968, Ser. No. 718,334
Int. Cl. C07b 29/06; B01k 1/00
U.S. Cl. 204—72
7 Claims

ABSTRACT OF THE DISCLOSURE

Heterocyclic compounds containing both 5- and 6-membered rings such as furan, thiophene, pyrrole, pyran, thiopyran, and pyridine are polymerized by subjecting the compounds to electrolysis in the presence of an organic solvent, a specific example being the electrolysis of furan in acetic acid to form polyfuran.

This invention relates to a process for the polymerization of heterocyclic compounds and particularly to a process for polymerizing heterocyclic compounds by an electrolytic method.

Polymerized heterocyclic compounds may find a wide variety of use in the chemical field inasmuch as the polymers possess thermal stabilities of at least 400° C., and thus may be used in places where material is to be subjected to a relatively large or extreme amount of heat. In addition, the polymers which are prepared from pyrrole or pyridine possess an additional property of being an electrical conductor and thus may be used in objects where an electrical current is to be passed from one place to another. As an advantage, inasmuch as is possible to control the number of pyrrole units or pyridine units, the conductivity of the polymer may be controlled. Furthermore, by utilizing various solvents when polymerizing pyrrole or pyridine, it is possible to vary the polymer. For example, when utilizing ionic solvents such as alcohols or acids it is possible to incorporate the organic portion of the alcohol or acid into the polymer and thus alter the physical property of the resultant polymeric material. By varying the physical properties, it is possible to introduce desirable characteristics into the polymer, thus rendering said polymer more valuable in certain instances where specific properties constitute a desired and necessary portion of the finished polymer.

It is therefore an object of this invention to provide a process for the polymerization of heterocyclic compounds.

A further object of this invention is to polymerize heterocyclic compounds by means of electrolysis.

In one aspect an embodiment of this invention is found in a process for the polymerization of a heterocyclic compound which comprises subjecting said compound to electrolysis in an aqueous alkaline-organic solvent medium, and recovering the resultant polymer.

A specific embodiment of this invention is found in a process for the polymerization of a heterocyclic compound which comprises subjecting thiophene to electrolysis at a temperature in the range of from about ambient to about 250° C. and at a pressure in the range of from about atmospheric to about 100 atmospheres in the presence of an aqueous alkaline-acetic acid medium, and recovering the resultant polythiophene.

Other objects and embodiments will be found in the following further detailed description of the present invention.

As hereinbefore set forth, the present invention is concerned with a process for the polymerization of heterocyclic compounds. These compounds may contain 5- or 6-membered rings and may, if so desired, contain substituents. These substituents may be selected from the group consisting of halogen, aromatic, alkyl, of from 1 to 20 carbon atoms, cycloalkyl, alkaryl, aralkyl, alkoxy, acyl, etc. radicals. Some specific examples of these heterocyclic compounds which may be used include furan, thiophene, pyrrole, pyran, thiapyran, pyridine, 2-methylfuran, 3-methylfuran, 2-ethylfuran, 3-ethylfuran, 3-n-butylfuran, 2-n-pentylfuran, 3-decylfuran, 2-tetradecylfuran, 2,3-dimethylfuran, 2,3-diethylfuran, 3,4-di-n-propylfuran, 3,4-didodecylfuran, 2-chlorofuran, 3-bromofuran, 3,4-dichlorofuran, 2,3-diiodofuran, 3,4-difurylfuran, 2-phenylfuran, 3-benzylfuran, 2-(p-tolyl)furan, 2-cyclopentylfuran, 3-cyclohexylfuran, 3-methoxyfuran, 2-ethoxyfuran, 3,4-dipropoxyfuran, 2-acetylfuran; 2-methylthiophene, 3-methylthiophene, 2-ethylthiophene, 3-ethylthiophene, 3-n-butylthiophene, 2-n-pentylthiophene, 3-decylthiophene, 2-tetradecylthiophene, 2,3-dimethylthiophene, 2,3-diethylthiophene, 3,4-di-n-propylthiophene, 3,4-didodecylthiophene, 2-chlorothiophene, 3-bromothiophene, 3,4-dichlorothiophene, 2,3-diiodothiophene, 3,4-difurylthiophene, 2-phenylthiophene, 3-benzylthiophene, 2-(p-tolyl)thiophene, 2-cyclopentylthiophene, 3-cyclohexylthiophene, 3-methoxythiophene, 2-ethoxythiophene, 3,4-dipropoxythiophene, 2-acetylthiophene; 2-methylpyrrole, 3-methylpyrrole, 2-ethylpyrrole, 3-ethylpyrrole, 3-n-butylpyrrole, 2-n-pentylpyrrole, 3-decylpyrrole, 2-tetradecylpyrrole, 2,3-dimethylpyrrole, 2,3-diethylpyrrole, 3,4-di-n-propylpyrrole, 3,4-didodecylpyrrole, 2-chloropyrrole, 3-bromopyrrole, 3,4-dichloropyrrole, 2,3-diiodopyrrole, 3,4-difurylpyrrole, 2-phenylpyrrole, 3-benzylpyrrole, 2-(p-tolyl)pyrrole, 2-cyclopentylpyrrole, 3-cyclohexylpyrrole, 3-methoxypyrrole, 2-ethoxypyrrole, 3,4-dipropoxypyrrole, 2-acetylpyrrole; 2-methylpyran, 3-methylpyran, 2-ethylpylpyran, 3-ethylpyran, 3-n-butylpyran, 2-n-pentylpyran, 3-decylpyran, 2-tetradecylpyran, 2,3-dimethylpyran, 2,3-diethylpyran, 3,4-di-n-propylpyran, 3,4-didodecylpyran, 2-chloropyran, 3-bromopyran, 3,4-dichloropyran, 2,3-diiodopyran, 3,4-difurylpyran, 2-phenylpyran, 3-benzylpyran, 2-(p-tolyl)pyran, 2-cyclopentylpyran, 3-cyclohexylpyran, 3-methoxypyran, 2-ethoxypyran, 3,4-dipropoxypyran, 2-acetylpyran; 2-methylthiapyran, 3-methylthiapyran, 2-ethylthiapyran, 3-ethylthiapyran, 3-n-butylthiapyran, 2-n-pentylthiapyran, 3-decylthiapyran, 2-tetradecylthiapyran, 2,3-dimethylthiapyran, 2,3-diethylthiapyran, 3,4-di-n-propylthiapyran, 3,4-didodecylthiapyran, 2-chlorothiapyran, 3-bromothiapyran, 3,4-dichlorothiapyran, 2,3-diiodothiapyran, 3,4-difurylthiapyran, 2-phenylthiapyran, 3-benzylthiapyran, 2-(p-tolyl)thiapyran, 2-cyclopentylthiapyran, 3-cyclohexylthiapyran, 3-methoxythiapyran, 2-ethoxythiapyran, 3,4-dipropoxythiapyran, 2-acetylthiapyran; 2-methylpyridine, 3-methylpyridine, 2-ethylpyridine, 3-ethylpyridine, 3-n-butylpyridine, 2-n-pentylpyridine, 3-decylpyridine, 2-tetradecylpyridine, 2,3-dimethylpyridine, 2,3-diethylpyridine, 3,4-di-n-propylpyridine, 3,4-didodecylpyridine, 2-chloropyridine, 3-bromopyridine, 3,4-dichloropyridine, 2,3-diiodopyridine, 3,4-difurylpyridine, 2-phenylpyridine, 3-benzylpyridine, 2-(p-tolyl)pyridine, 2-cyclopentylpyridine, 3-cyclohexylpyridine, 3-methoxypyridine, 2-ethoxypyridine, 3,4-dipropoxypyridine, 2-acetylpyridine; etc. It is also contemplated within the scope of this invention that heterocyclc compounds containing more than 1 oxygen, sulfur, or nitrogen atom such as pyrazole, imidazole, oxazole, isothiazole, trioxane, pyridazine, pyrimedine, pyrazine, trizaine, oxazine and substituted compounds thereof may also be used, although not necessarily with equivalent results. It is to be understood that the aforementioned heterocyclic compounds are only representative, and that the present invention is not necessarily limited thereto.

The electrolysis of the heterocyclic compound to prepare polymers thereof is effected in the presence of organic solvents and an alkaline medium. The solvents which are utilized in this process are those which possess a high dielectric constant, high polarity and in addition should also possess good solubility for the alkaline medium. Furthermore, the solvent may also be ionic or non-ionic in character depending upon whether or not the desired product, in the case of a heterocyclic compound containing a nitrogen atom in the ring, is to contain a radical substituted on the aforesaid nitrogen atom in the ring. Examples of ionic solvents which may be used include the alcohols such as methanol, ethanol, n-propanol, isopropanol, n-butanol, t-butanol, n-pentanol, n-hexanol, n-heptanol, n-octanol and isomers thereof, etc.; carboxylic acids such as formic acid, acetic acid, propionic acid, butyric acid, valeric acid, etc.; glycols such as ethyl glycol, dethylene glycol, propylene glycol, etc.; examples of non-ionic solvents will include dimethyl sulfoxide; dimethyl formamide, tetrahydrofuran, dioxane; ethers such as dimethyl ether, diethyl ether, dipropyl ether, dibutyl ether, etc. The alkalinity of the medium in which the electrolysis is effected is provided for by alkali metal and alkaline earth metal hydroxides such as potassium hydroxide, sodium hydroxide, lithium hydroxide, rubidium hydroxide, cesium hydroxide. Less preferably calcium hydroxide, magnesium hydroxide, strontium hydroxide, sodium-p-toluenesulfonic acid, potassium-p-toluenesulfonic acid, sodium benzenesulfonic acid, potassium benzene sulfonic acid, corresponding xylyl sulfonic acid salts, etc., may also be used. It is also contemplated within the scope of this invention that salts may be used, although not necessarily with equivalent results, said salts including sodium carbonate, potassium carbonate, lithium carbonate, calcium carbonate, etc.

The electrolysis conditions under which the process of this invention is effected will include temperatures in the range of from ambient (about 20° C.) up to about 250° C. or more and a pressure ranging from atmospheric up to about 100 atmospheres or more. When utilizing temperatures in the upper portion of the temperature range hereinbefore set forth where the operating temperature of the process is above the boiling point of the solvent which is used, it will be necessary to utilize superatmospheric pressures in order to maintain the reactants in a liquid phase. When superatmospheric pressures of the type hereinbefore set forth is required, the necessary pressure will be provided for by utilizing an inert gas such as nitrogen into the reaction vessel. It is to be understood that specific process conditions of temperature and pressure may vary with the different cell structures, with the ratio of the volume of the catholyte to the surface area of the cathode, the ratio of volume of anolyte to the surface area of the anode, etc. Also, the current density which is used to effect the electrolysis will also vary, said current density ranging from about 0.5 ampere per square decimeter up to about 40 amperes per square decimeter of cathode area. The time during which the electrolysis or polymerization of the heterocyclic compound to the polymer thereof will take place during a residence time which may be in a range of from about 2.5 up to about 10 hours or more in duration.

The electrolysis cell in which the polymerization reaction of the present invention may be effected may be of any suitable structure known in the art and may comprise a single compartmented cell or a cell which is bi-compartmentalized. For example, the cell may be made of glass and will contain electrodes containing platinum, the solution being stirred by means of a plastic encased magnetic stirrer. When utilizing a cell containing more than one compartment, the anolyte may be separated from the catholyte by a semi-porous membrane; these separation means being made of any material known in the art and will include sintered glass, membranes made of synthetic materials such as synthetic cellulose or membranes made of polystyrene sulfonate which is cross-linked with divinyl benzene. In addition, other membranes which may be used include felted asbestos or porous alumina which is in a low micron range. The anolyte will comprise the heterocyclic compound of the type hereinbefore set forth in greater detail in an aqueous alkaline medium which also contains the desired solvent. After placing the solution in the electrolysis cell, the current which may comprise an amperage in the range hereinbefore set forth and a voltage ranging from about 1 to about 10 volts which is thereafter charged to the cell. After a predetermined amount of current, in a range of from about 0.1 up to about 0.5 faraday, has been charged, the electrolysis is allowed to proceed for the desired residence time. At the end of this time, the reaction product is recovered and the desired product comprising the polymer is recovered by conventional means which will include separation, filtration, washing, etc.

The following examples are given to illustrate the process of the present invention which, however, are not intended to limit the generally broad scope of the present invention in strict accordance therewith.

EXAMPLE I

In this example an electrolytic cell was constructed of glass using a water jacket as a means of controlling the temperature of the cell. The cell comprised a single compartment containing 1 anode and 2 cathodes. The area of the platinum anode was 80 square centimeters and the area of the cathode was 4 square centimeters. In addition, the other cathode comprised a standard calomel electrode. A solution comprising 348 grams of acetic acid and 28 grams of potassium hydroxide in 100 grams of water was placed in the cell. In addition, 84 grams (1.0 mole) of thiophene was added and cooling water was run through the jacket in order to maintain the temperature of the solution at ambient temperature. A current of 1.0 amp and 6.0 volts was charged thereto. After 0.225 faraday of electricity had been charged during a period of about 6 hours, the electric charge was discontinued. The product which was recovered was analyzed by means of infra-red spectra and elemental analysis to varify the polymer of polythiophene.

EXAMPLE II

In this example a solution of 100 grams of water, 14 grams of potassium hydroxide and 353 grams of acetic acid were placed in an electrolytic cell similar in nature to that described in Example I above. In addition, 33 grams (0.5 mole) of pyrrole were added to the cell which was maintained at ambient temperature by means of cooling water charged to a water jacket surrounding the electrolytic cell. A current of 2.0 amps and 6.0 volts was charged to the cell. After 0.450 faraday of electricity had been charged during a period of 6 hours, the electric charge was discontinued. The insoluble solid product which was recovered was subjected to infra-red spectra. In addition, elemental analysis, the results of which are set forth below, indicated the product to be polypyrrolium acetate.

Calcd. for polypyrrolium acetate (percent): C, 58.0; H, 5.6; N, 11.2. Found (percent): C, 59.3; H, 5.6; N, 13.5.

EXAMPLE III

In this example a solution of 300 grams of ethyl ether, 14 grams of potassium hydroxide, 100 grams of water, and 34 grams (0.5 mole) of furan is placed in an electrolytic cell comprising a single compartment glass cell containing 2 platinum electrodes and a calomel electrode. The area of platinum anode is 80 square centimeters and the area of the platinum cathode is 4 square centimeters. The temperature of the cell is maintained at approximately 25° C. by means of cooling water circulated through a water jacket surrounding said cell. A current of 1.0 amp and 6.0 volts is charged to the cell. After 0.225 faraday of electricity is charged during a period of 6 hours the electric charge is discontinued. The solid product which is recovered is analyzed by means of infra-red spectra and is found to comprise polyfuran.

EXAMPLE IV

A solution of 43 grams (0.05 mole) of pyran, 100 grams of water, 14 grams of sodium hydroxide and 350 grams of acetic acid is placed in an electrolytic cell similar to that set forth in the above examples. While maintaining the temperature of the cell at approximately 25° C., a current of 2.0 amps and 6.0 volts is charged to said cell. After 0.450 faraday of electricity is charged during a period of 6 hours, the electric charge is discontinued. After recovery of the solid product, the product is analyzed by means of infra-red spectra and will be found to comprise polypyran.

EXAMPLE V

In this example a solution of 79 grams (1.0 mole) of pyridine, 100 grams of water, 14 grams of potassium hydroxide, and 350 grams of ethyl ether is placed in an electrolytic cell similar in nature to that described in the above examples. A current of 2.0 amps and 6.0 volts is charged to the cell. After 0.450 faraday of electricity are charged during a period of 6 hours, the electric charge is discontinued and the reaction product is recovered. Elemental analysis and infra-red spectra of the product will disclose the presence of polypyridine.

I claim as my invention:

1. A process for producing a polymer of a nuclearly unsaturated heterocyclic compound selected from the group consisting of furans, thiophenes and pyrroles which comprises polymerizing said compound by electrolysis in an aqueous alkaline-organic solvent medium at a temperature of from about 20° C. to about 250° C., a pressure of from about atmospheric to about 100 atmospheres, a current density of from about 0.5 to about 40 amperes per square decimeter of cathode area, a voltage of from about 1 to about 10 volts, a quantity of electricity of from about 0.1 to about 0.5 faraday, and for a residence time of from about 2.5 to about 10 hours, and recovering the resultant polymer.

2. The process as set forth in claim 1, further characterized in that said organic solvent comprises ethyl ether.

3. The process as set forth in claim 2, further characterized in that said heterocyclic compound comprises furan and said polymer comprises polyfuran.

4. The process as set forth in claim 2, further characterized in that said heterocyclic compound comprises thiophene and said polymer comprises polythiophene.

5. The process as set forth in claim 2, further characterized in that said heterocyclic compound comprises pyrrole and said polymer comprises polypyrrole.

6. The process as set forth in claim 1, further characterized in that said organic solvent comprises acetic acid.

7. The process as set forth in claim 6, further characterized in that said heterocyclic compound comprises pyrrole and said polymer comprises polypyrrolium acetate.

References Cited

UNITED STATES PATENTS

| | | | |
|---|---|---|---|
| 2,748,131 | 5/1956 | Smith et al. | 260—326.6X |
| 3,193,480 | 7/1965 | Baizer et al. | 204—72X |
| 3,335,075 | 8/1967 | Borman | 204—78X |

FREDERICK C. EDMUNDSON, Primary Examiner

U.S. Cl. X.R.

260—313.1, 329, 346.1